D. F. LONDT.
SAFETY TRACTOR HITCH.
APPLICATION FILED JUNE 6, 1919.
1,347,346.
Patented July 20, 1920.
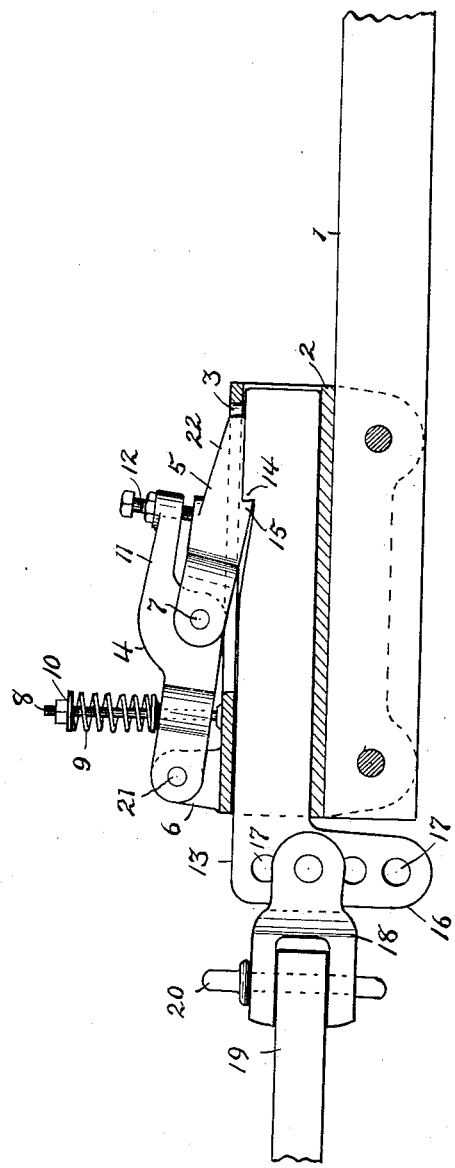
David Franklin Londt INVENTOR
BY
H. G. Burns ATTORNEY

UNITED STATES PATENT OFFICE.

DAVID F. LONDT, OF COLUMBIA CITY, INDIANA.

SAFETY TRACTOR-HITCH.

1,347,346. Specification of Letters Patent. Patented July 20, 1920.

Application filed June 6, 1919. Serial No. 302,337.

*To all whom it may concern:*

Be it known that I, DAVID FRANKLIN LONDT, a citizen of the United States of America, and resident of Columbia City, in the county of Whitley and State of Indiana, have invented certain new and useful Improvements in Safety Tractor-Hitches, of which the following is a specification.

This invention relates to improvements in safety tractor hitches, and the object thereof is to provide a mechanism for coupling a tractor and plow together, which will effect the release of the plow from connection with the tractor in the event the plow encounters an unyielding obstruction while being drawn by the tractor.

Another object is to construct the mechanism that it may be adjusted so the plow will become released at different degrees of resistance which it encounters while being drawn by the tractor.

The objects of the improvement are accomplished by the construction illustrated in the accompanying drawing, which is a side view partly in section showing the device attached to the beam of a plow.

1 is a plow-beam having mounted upon its forward end a socket casting 2, the latter being open at both ends and having an elongated slot 3 in its top. A toggle consisting of a spring-pressed member 4 and a locking member 5, is mounted upon the socket casting, the forward end of the member 4 having pivotal connection therewith between projecting lugs 6 and the locking member 5 having pivotal connection as indicated by 7 with the other member.

A stud 8 extends up through the member 4 and a compression spring 9 is arranged upon the stud between the member 4 and the adjusting nut 10 which has threaded relation with the stud. The rearwardly projecting end 11 of the toggle member 4 has an adjustable stop 12 mounted therein, the lower end of which normally bears against the adjacent upper face of the locking member.

A draw-bar 13 provided with a shoulder 14 is removably positioned in the socket casting and is adapted to be normally engaged and held therein by the locking member 5, the latter having a lip 15 that is adapted to engage the shoulder and prevent the draw-bar from being withdrawn. The forward end of the draw-bar has a head 16 with numerous perforations 17 therein which serves as a clevis for the plow and for connection with a coupler 18 which is secured to the draw-bar 19 of a tractor by a coupling pin 20.

The locking member is held in engagement with the draw-bar 13 by the pressure of the spring 9 through the medium of the toggle member 4 and stop 12, and the latter is adjusted so that the pivot 7 connecting the toggle members will be held at a point slightly above a plane extending through the point of connection between the locking member and the draw-bar and the pivot 21 upon which the forward end of the member 4 is mounted. The locking member has a projection 22 extending rearwardly beyond its lip 15 and which bears upon the upper face of the draw-bar back of the shoulder 14 on the latter.

In the operation of the invention the plow is normally held in connection with the tractor draw-bar through the medium of the parts described and functions in the usual manner. In the event the plow meets with an unyielding obstruction, the excessive resistance occasions unusual force to be applied by the shoulder 14 against the lip 15 on the locking member whereupon the latter forces the other toggle member to swing upon its pivotal support upwardly against the spring 9. In thus moving, the forward end of the locking member is raised and the lip 15 thereby becomes withdrawn from engagement with the shoulder 14 on the draw-bar and thus the plow is released from connection with the latter. The extension 22 bears upon the draw-bar and serves as a fulcrum when the locking member moves out of engagement with the draw-bar. Connection between the tractor and the plow is reëstablished by backing the draw-bar into the socket casting to its former position.

By adjusting the stop 12 the normal position of the pivot 7 may be changed with the result that the toggle will function more or less readily in releasing the draw-bar.

What I claim is:

In a hitch for connecting a tractor and plow, a socket on the plow-beam; a draw-bar extending removably into the socket; a pair of toggles pivoted together, one having pivotal support on the socket and the other locking engagement with the draw-bar; a spring for holding the toggles in locking position; and adjustable means in connection with one of the toggles and having bearing relation with the other to limit the relative movement thereof.

In testimony whereof I affix my signature in presence of two witnesses.

DAVID F. LONDT.

Witnesses:
MATILDA METTLER,
WALTER G. BURNS.